United States Patent
Okubo et al.

(10) Patent No.: US 7,521,031 B2
(45) Date of Patent: Apr. 21, 2009

(54) METHOD AND APPARATUS FOR TREATING EXHAUST GAS

(75) Inventors: Masaaki Okubo, Sakai (JP); Toshiaki Yamamoto, Sakai (JP); Tomoyuki Kuroki, Sakai (JP)

(73) Assignee: Osaka Industrial Promotion Organization, Osaka (JP)

( * ) Notice: Subject to any disclaimer, the term of this patent is extended or adjusted under 35 U.S.C. 154(b) by 420 days.

(21) Appl. No.: 10/576,369

(22) PCT Filed: Oct. 6, 2004

(86) PCT No.: PCT/JP2004/014737

§ 371 (c)(1),
(2), (4) Date: Apr. 19, 2006

(87) PCT Pub. No.: WO2005/037412

PCT Pub. Date: Apr. 28, 2005

(65) Prior Publication Data

US 2007/0071657 A1 Mar. 29, 2007

(30) Foreign Application Priority Data

Oct. 21, 2003 (JP) ............................. 2003-361010

(51) Int. Cl.
*B01D 53/46* (2006.01)
*B01D 53/50* (2006.01)
*B01D 53/56* (2006.01)
*B01D 53/62* (2006.01)
*B01D 53/72* (2006.01)
*B01D 53/74* (2006.01)
*B01D 53/75* (2006.01)
*B01D 53/92* (2006.01)
*B01J 19/08* (2006.01)
*G05D 21/00* (2006.01)

(52) U.S. Cl. ................. 423/210; 423/213.2; 423/213.7; 423/220; 423/230; 423/235; 423/239.1; 423/242.1; 423/245.3; 423/246; 423/247; 422/105; 422/168; 422/169; 422/170; 422/177; 422/178; 422/180; 422/186.04; 422/186.21; 204/164; 204/179

(58) Field of Classification Search ................. 204/164, 204/179; 422/105, 168, 169, 170, 177, 178, 422/180, 186.04, 186.21; 423/210, 213.2, 423/213.7, 220, 230, 235, 239.1, 242.1, 245.3, 423/246, 247

See application file for complete search history.

(56) References Cited

U.S. PATENT DOCUMENTS 5,362,463 A 11/1994 Stiles et al.
(Continued)

FOREIGN PATENT DOCUMENTS

EP 1 216 746 A2 6/2002
(Continued)

OTHER PUBLICATIONS

Search Report for corresponding EP application No. 04792093.9, dated Sep. 18, 2007.

*Primary Examiner*—Timothy C Vanoy
(74) *Attorney, Agent, or Firm*—Hamre, Schumann, Mueller & Larson, P.C.

(57) ABSTRACT

A method for treating exhaust gas includes: adsorbing target components in the exhaust gas with an adsorbent (5); introducing a nitrogen gas with an oxygen concentration of 10 vol % or less and a purity of 90 vol % or more into the adsorbent (5); and applying (6, 7, 8) nonthermal plasma to the adsorbent (5). After the adsorbent (5) adsorbs the target components in the exhaust gas, the nitrogen gas is introduced into the adsorbent (5), and then an electric discharge is generated so that the nonthermal plasma of the nitrogen gas is applied to the adsorbent (5) and causes desorption of the target components and regeneration of the adsorbent (5). This method can remove the target components effectively from oxygen-containing exhaust gas by using nitrogen gas plasma with high activity as a result of ionization of a nitrogen gas and combining adsorption, desorption by the nitrogen gas plasma, and nitrogen plasma treatment.

19 Claims, 10 Drawing Sheets

U.S. PATENT DOCUMENTS

| | | | |
|---|---|---|---|
| 6,146,599 A * | 11/2000 | Ruan et al. | 422/186.04 |
| 6,374,595 B1 | 4/2002 | Penetrante et al. | |
| 6,508,057 B1 | 1/2003 | Bouchez et al. | |
| 6,994,830 B1 | 2/2006 | Raybone et al. | |
| 2004/0219084 A1* | 11/2004 | Hall et al. | 423/235 |

FOREIGN PATENT DOCUMENTS

| | | |
|---|---|---|
| EP | 1 216 746 A3 | 6/2002 |
| JP | 7-213859 | 8/1995 |
| JP | 11-114351 | 4/1999 |
| JP | 2000-117049 | 4/2000 |
| JP | 2000-170523 A * | 6/2000 |
| JP | 2001-300257 | 10/2001 |
| JP | 2002-115531 | 4/2002 |

* cited by examiner

METHOD AND APPARATUS FOR TREATING EXHAUST GAS

TECHNICAL FIELD

The present invention relates to a method and apparatus for treating exhaust gas. Specifically, the present invention relates to a method and apparatus for treating exhaust gas that can provide an effective treatment of components to be treated (also referred to as "target components" in the following) such as nitrogen oxides ($NO_x$) contained in the exhaust gas with nonthermal plasma.

BACKGROUND ART

Combustion gas generated in combustion equipment such as an internal combustion engine, a boiler, or a gas turbine is emitted through an exhaust system. As the regulations of exhaust emissions are strengthened, the combustion equipment has been improved, e.g., by modifying the fuel composition, circulating the exhaust gas back into the combustion equipment, and enhancing the combustion process. On the other hand, there has been an attempt to remove harmful components (target components) from the exhaust gas that comes out of the combustion equipment by a dry catalytic treatment apparatus.

The use of nonthermal plasma, which is characterized by extremely high electron temperature and low gas temperature, is being studied as a means for treating nitrogen oxides ($NO_x$) and cleaning the exhaust gas, and a PPCP (pulse corona induced plasma chemical process) or a hybrid method (see the following Patent Document 1) has been proposed. The majority of $NO_x$ contained in the exhaust gas is in the form of nitric oxide (NO). In the PPCP, the exhaust gas enters a nonthermal plasma reactor, where NO reacts with an ammonia gas and is converted into ammonium nitrate particles. The ammonium nitrate particles are collected by an electric precipitator. In the hybrid method, NO is oxidized almost completely to nitrogen dioxide ($NO_2$) without ammonia, and then is reduced to nitrogen ($N_2$) and water in a wet chemical processing apparatus, which is provided separately.

In general, the exhaust gas concentrations are likely to be low. Therefore, considerable energy per unit concentration or flow rate is required to treat the exhaust gas efficiently using plasma. This increases the running cost. Thus, technologies that allow the target components first to be adsorbed with an adsorbent, and then desorbed and concentrated with plasma have been proposed (see the following Patent Documents 2 and 3).

Patent Document 1: JP 2000-117049 A
Patent Document 2: JP 11(1995)-114351 A
Patent Document 3: JP 2001-300257 A However, when the conventional exhaust gas treatment apparatus is applied to stationary combustion equipment (e.g., a boiler or gas turbine) or mobile combustion equipment (e.g., a diesel car), there are several disadvantages: the efficiency is relatively low; the cost is high; a significant amount of water is required; and the apparatus becomes larger in size. Accordingly, a dry chemical processing apparatus should be used as much as possible, instead of the wet chemical processing apparatus as disclosed in Patent Document 1.

A catalytic treatment such as dry selective catalytic reduction (SCR) also has some problems. The catalyst itself includes a noble metal and is relatively expensive. The reserves are limited, and the catalyst life is rather short. Moreover, the catalyst may be affected by poisoning when sulfur is present in the fuel, or responsible for clogging that raises the back pressure and lowers the combustor performance. Therefore, it would be desirable to avoid using the catalyst.

In a so-called diesel engine, light oil is used as a fuel, and the fuel ignites under high compression. The diesel exhaust gas contains a large amount of oxygen, which makes it difficult to use a three-way catalyst that has been utilized widely for gasoline cars.

The SCR or PPCP generally uses ammonia along with a catalyst or plasma in the $NO_x$ treatment. However, the ammonia is difficult to handle and hazardous to people's health. There is also a risk of leakage from the apparatus or release of unreacted ammonia gas into the atmosphere. Thus, it is desirable not to use ammonia.

Moreover, the PPCP causes a significant amount of combustible ammonium nitride particles. Therefore, when the PPCP is applied to the mobile combustion equipment (e.g., a diesel car), it will pose a problem of the ammonium nitride particles removal.

The exhaust gas emitted from the combustion equipment generally contains oxygen with a volume concentration of about 2 to 10%. Therefore, the application of plasma to the exhaust gas in a plasma reactor hardly decreases $NO_x$ (=NO+$NO_2$), but simply oxidizes NO to $NO_2$. Thus, it does not help to reduce environmental pollution. Further, an additional process such as the hybrid method or PPCP is necessary to remove the resultant $NO_2$.

In the method of Patent Document 2, when plasma including oxygen ($O_2$) is used for desorption of $NO_x$ or the like, the desorbed amount is small and the efficiency is low. As a method for treating the desorbed gas, if the desorbed gas is a combustible gas such as volatile organic compounds (VOCs), it can ignite and burn easily. However, if the desorbed gas is a non-combustible gas, the treatment method has not been established yet.

In the method of Patent Document 3, the exhaust gas first is cooled so that a harmful gas is adsorbed with an adsorbent, and then the harmful gas is decomposed directly by plasma that is generated in the exhaust gas. However, this method includes neither desorbing the harmful gas nor regenerating the adsorbent. Moreover, since the method does not use nitrogen plasma, the treatment efficiency is not high, and long-time use of the adsorbent also is a problem.

DISCLOSURE OF INVENTION

Therefore, with the foregoing in mind, it is an object of the present invention to provide a method and apparatus for treating exhaust gas that can remove target components effectively from oxygen-containing exhaust gas by using nitrogen gas plasma with high activity as a result of ionization of a nitrogen gas and combining adsorption, desorption by the plasma composed mainly of nitrogen, and nitrogen plasma treatment.

A method for treating exhaust gas of the present invention includes: adsorbing target components in the exhaust gas with an adsorbent; introducing a nitrogen gas with an oxygen concentration of 10 vol % or less and a purity of 90 vol % or more into the adsorbent; and applying nonthermal plasma to the adsorbent. After the adsorbent adsorbs the target components in the exhaust gas, the nitrogen gas is introduced into the adsorbent, and then an electric discharge is generated so that the nonthermal plasma of the nitrogen gas is applied to the adsorbent and causes desorption of the target components and regeneration of the adsorbent.

An apparatus for treating exhaust gas of the present invention includes: an adsorption portion for adsorbing target components in the exhaust gas with an adsorbent; a gas flow path through which a nitrogen gas with an oxygen concentration of 10 vol % or less and a purity of 90 vol % or more is introduced into the adsorbent; and a reactor for applying nonthermal plasma to the adsorbent. The adsorbent adsorbs the target components in the exhaust gas, the nitrogen gas flows through the gas flow path in which the adsorbent is present, and an electric discharge is generated so that the nonthermal plasma of the nitrogen gas is applied to the adsorbent and causes desorption of the target components and regeneration of the adsorbent.

BEST MODE FOR CARRYING OUT THE INVENTION

Figure 1:
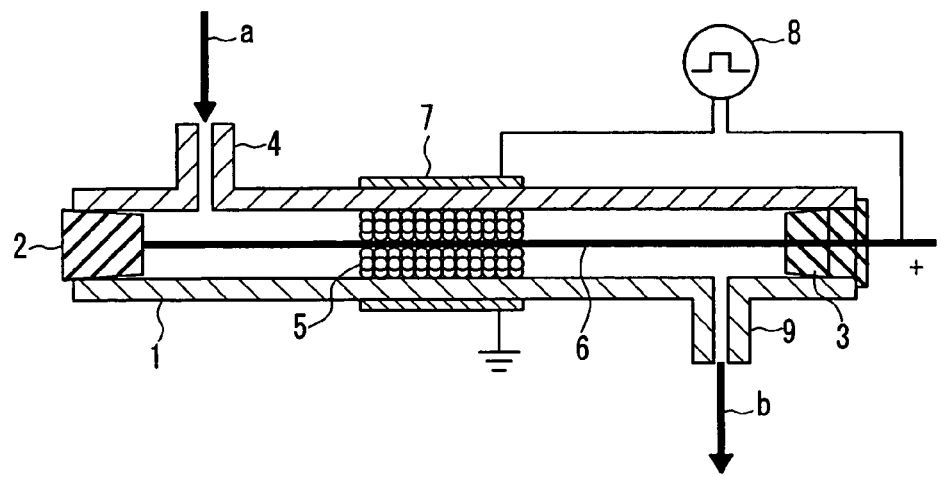
FIG. 1 is a schematic diagram showing an embodiment of a method for treating exhaust gas by adsorption and desorption of the present invention.

In the present invention, the target components such as nitrogen oxides ($NO_x$) contained in exhaust gas are adsorbed (absorbed) with an adsorbent, and then desorbed (eliminated) rapidly and efficiently with plasma composed mainly of a nitrogen gas. Thus, the target components increase in concentration, and the adsorbent is regenerated simultaneously. Moreover, the desorbed target components are removed downstream efficiently using plasma composed mainly of a nitrogen gas and discharged into the atmosphere. By utilizing these technologies with adsorbent switching and exhaust gas recirculation, the present invention can provide a method and apparatus for treating exhaust gas with high efficiency and low energy consumption.

The following method and apparatus of the present invention achieve a high-efficiency energy-saving treatment of the exhaust gas and therefore can contribute to the preservation of the global environment.

The term "nonthermal plasma" used in the context of the present invention refers to ionized plasma whose gas temperature is much lower than the general combustion temperature (about 700 to 1000° C.) of gases, and ordinarily is 300° C. or less. The particularly preferred conditions are as follows: the temperature is 100° C. or less; the pressure is approximately at atmospheric pressure; the relative humidity is about 60% or less; the applied voltage is 1 to 50 kV; and the peak current is 1 to 100 A.

As a first invention, the method of the present invention includes adsorbing the target components in exhaust gas with an adsorbent, introducing a nitrogen gas with an oxygen concentration of 10 vol % or less and a purity of 90 vol % or more into the adsorbent, and applying nonthermal plasma to the adsorbent. After the adsorbent adsorbs the target components in the exhaust gas, the nitrogen gas flows through a flow path in which the adsorbent is present, and then an electric discharge is generated so that the nonthermal plasma of the nitrogen gas is applied to the adsorbent and causes desorption (elimination) of the target components and regeneration of the adsorbent.

As a second invention, the method of the present invention further includes removing the target components desorbed by the nitrogen gas plasma in a nonthermal plasma reactor that follows or is integrated with the adsorbent.

It is preferable that the adsorbent is zeolite with an average pore size of 0.1 to 5 nm.

It is preferable that the exhaust gas is combustion exhaust gas, and the target components are at least one selected from the group consisting of NO, $NO_2$, $N_2O$, $N_2O_5$, $SO_2$, $SO_3$, volatile organic compounds (VOCs), pollutants as typified by dioxins, hydrocarbons, CO, $CO_2$, and water vapor ($H_2O$). For example, nitrogen oxides ($NO_x$) such as NO, $NO_2$, $N_2O$ and $N_2O_5$ can be reduced to a nitrogen gas ($N_2$), and sulfur oxides ($SO_x$) such as $SO_2$ and $SO_3$, hydrocarbons, CO, $CO_2$, volatile organic compounds (VOCs) such as toluene, benzene and xylene, pollutants such as dioxins, halogenated aromatic substances and highly condensed aromatic hydrocarbons can be decomposed or converted into harmless substances.

The nitrogen gas with an oxygen concentration of 10 vol % or less and a purity of 90 vol % or more may be part of exhaust gas emitted from a diesel engine. Thus, the exhaust gas emitted from the diesel engine can be utilized effectively.

The gas temperature of the nitrogen gas plasma is preferably 1000 K or less. The lower limit is not particularly set, and the gas temperature may be −100° C. or even −200° C., besides room temperature (27° C.).

It is preferable that the plasma is applied by using pulse discharge with an alternating or direct voltage, silent discharge, corona discharge, surface discharge, barrier discharge, honeycomb discharge, pellet packed bed discharge, or any combination of these processes.

It is preferable that the plasma is applied by using arc discharge with an alternating or direct voltage, inductively coupled discharge, capacitively coupled discharge, microwave excited discharge, laser induced discharge, electron-beam induced discharge, particle-beam induced discharge, or any combination of these processes.

It is preferable that a catalyst is located in at least one of the following: inside of the adsorbent; inside of a plasma reactor; and downstream of the plasma reactor.

As a third invention, the apparatus of the present invention may include a plurality of flow paths arranged in a switchable manner, and a reactor for applying nonthermal plasma to the adsorbent and a plasma reactor for removing the target components are connected in series from the gas inlet toward the outlet in the flow paths. The exhaust gas enters from the upstream side, and the target components in the exhaust gas are adsorbed with the adsorbent. Subsequently, the flow paths are switched, and a nitrogen gas with a purity of 90 vol % or more is introduced into the adsorbent that has been used, thus desorbing the target components and regenerating the adsorbent with the plasma. After adsorption, the adsorbent can be reused to adsorb the exhaust gas. The desorbed target components such as $NO_x$ increase in concentration and are removed with low energy by a plasma reactor following the reactor for applying nonthermal plasma to the adsorbent.

It is preferable that the flow paths are switched by a valve or rotor.

It is preferable that the flow paths through which the target components are desorbed and converted into harmless components become an exhaust gas recirculation (EGR) system. The EGR system allows the adsorbed noxious components to be desorbed, circulated back to the combustor, and converted into harmless components.

The apparatus further may include an exhaust device that can accelerate the adsorption and desorption by changing the gas pressure to more than or less than atmospheric pressure.

The apparatus further may include a device that can accelerate the adsorption and desorption by heating or cooling the exhaust gas or the nitrogen gas.

The apparatus further may include a gas measuring device such as a sensor for detecting an oxygen concentration in the exhaust gas.

The apparatus further may include a particulate collector for collecting aerosol or particles in the exhaust gas.

The apparatus further may include a humidity controller for controlling the humidity of the exhaust gas or the nitrogen gas.

The apparatus may be installed in a combustion system of any one of a diesel engine, a boiler, a gas turbine, and an incinerator.

In the method and apparatus of the present invention, it is preferable that the target components are desorbed by applying nonthermal plasma to the adsorbent, and then removed downstream with nitrogen plasma.

Hereinafter, embodiments of the exhaust gas treatment apparatus of the present invention will be described with reference to the drawings. However, the present invention is not limited to the specific embodiments, and various changes, revisions, and modifications can be made without departing from the spirit and the scope of the invention.

The present invention relates to a method for treating exhaust gas in which target components such as $NO_x$ contained in the exhaust gas are adsorbed with an adsorbent, and then plasma composed mainly of nitrogen is applied to the adsorbent, so that the target components are desorbed efficiently and increase in concentration, while the adsorbent is regenerated (the first invention). The present invention also relates to the method in which the desorbed target components are removed downstream efficiently using plasma composed mainly of nitrogen and discharged into the atmosphere (the second invention). Moreover, the present invention relates to an apparatus for treating exhaust gas that employs the above methods and achieves a high-efficiency energy-saving treatment of the exhaust gas in combination with adsorbent switching and exhaust gas recirculation (the third invention).

FIG. 1 shows an embodiment of the first invention. This embodiment uses a reactor in which both ends of a quartz tube 1 are sealed with silicon rubber stoppers 2, 3. Exhaust gas a enters the reactor from an inlet 4 provided on the upper left side of the quartz tube 1. There is a pellet-type adsorbent 5 inside the reactor. The target components contained in the exhaust gas a are adsorbed by the pellet-type adsorbent 5 for a long time, and subsequently removed and discharged. After the adsorbent 5 adsorbs the target components, a nitrogen gas is introduced, and a power supply 8 applies a high-voltage pulse voltage between a discharge wire 6 in the reactor and a copper mesh electrode 7 placed around the outer surface of the reactor, thereby generating plasma. The plasma is applied to the adsorbent 5, so that the exhaust gas is desorbed in a short time, while the adsorbent 5 is regenerated. The treated gas b is discharged from an outlet 9. The quartz tube 1 has an inter diameter of 20 mm, an outer diameter of 26 mm, and a length of 450 mm. The pellet-packed bed and the copper mesh electrode have a length of 56 mm.

Any type of adsorbent may be used as long as it adsorbs the target components effectively and can release them. Preferred examples of the adsorbent include zeolite with an average pore size of 0.1 to 5 nm, activated carbon, alumina, cordierite, and polyester fiber. The lowest possible conductivity and higher permittivity are desirable because strong plasma can be generated. Moreover, the adsorbent is preferably in the form of a pellet or honeycomb to reduce the flow pressure loss.

Figure 2:
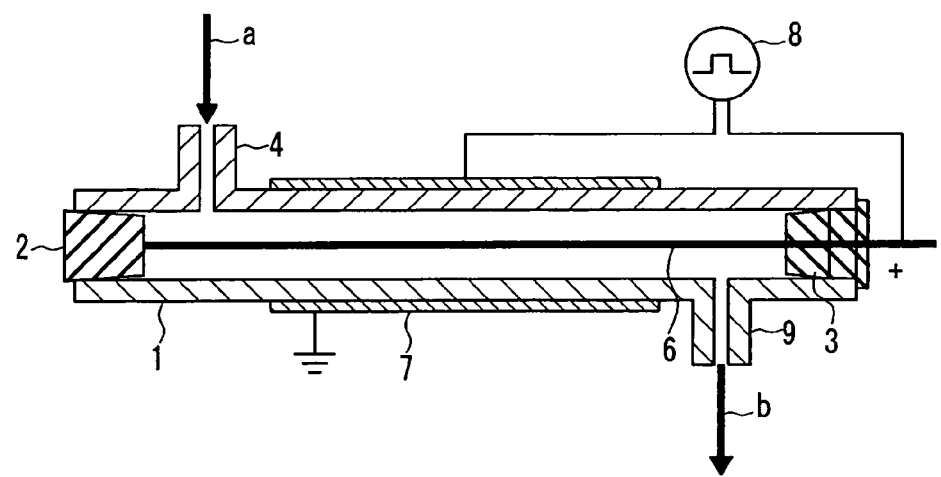
FIG. 2 is a schematic diagram showing an embodiment of a method for treating exhaust gas with plasma of the present invention.

FIG. 2 is a schematic diagram of a plasma reactor for removing the target components (also referred to as "target-component-removal plasma reactor" in the following). This plasma reactor decomposes the desorbed target components with nitrogen plasma and follows the adsorbent plasma reactor of FIG. 1. The adsorbent plasma reactor of FIG. 1 and the target-component-removal plasma reactor of FIG. 2 are combined as an embodiment of the second invention. In FIG. 2, the same elements as those in FIG. 1 are denoted by the same reference numerals, and the explanation will not be repeated. The desorbed gas containing the target components enters the plasma reactor from the inlet 4. Then, a high-voltage pulse voltage is applied between the discharge wire 6 and the copper mesh electrode 7, so that plasma is generated to remove the target components. When the target components contained in the exhaust gas are nitric oxide (NO), almost 100% of NO present can be reduced to $N_2$ by a reaction of nitrogen radicals and fast electrons produced by the nitrogen plasma.

The major components of the exhaust gas that are to be treated in the present invention include NO, $NO_2$, $N_2O$, $SO_2$, $SO_3$, CO, $CO_2$, VOCs, HC, and $H_2O$. However, the present invention also can be applied to other gas components.

Although the type of plasma generated in the target-component-removal plasma reactor is not particularly limited, the use of high-temperature (heat, thermal) nonequilibrium plasma at about 1000° C. is effective for gas (e.g., $CO_2$) that is hard to decompose. If the gas temperature is higher than this, a reduction in the energy efficiency is inevitable. The plasma can be applied by using any of the following: pulse discharge with an alternating or direct voltage; silent discharge; corona discharge; surface discharge; barrier discharge; honeycomb discharge; pellet packed bed discharge; arc discharge; inductively coupled discharge; capacitively coupled discharge; microwave excited discharge; laser induced discharge; electron-beam induced discharge; and particle-beam induced discharge. Alternatively, these processes can be used in combination.

The adsorbent plasma reactor and the target-component-removal plasma reactor of the present invention are not limited to the structures as shown in FIGS. 1 and 2, and various possible systems can be employed appropriately depending on the technique of plasma application.

To activate the reduction, a catalyst may be located in at least one of the following: inside of the adsorbent plasma reactor; inside of the target-component-removal plasma reactor; and downstream of the target-component-removal plasma reactor. The catalyst is used merely as a supplementary means for improving the performance of the treatment apparatus and therefore is not essential.

When the exhaust gas treatment apparatus based on the above methods is installed in a combustion system of any one of a diesel engine, a boiler, a gas turbine, and an incinerator, part of the output can be converted into electric power with a generator so as to drive the plasma reactors.

Figure 3:
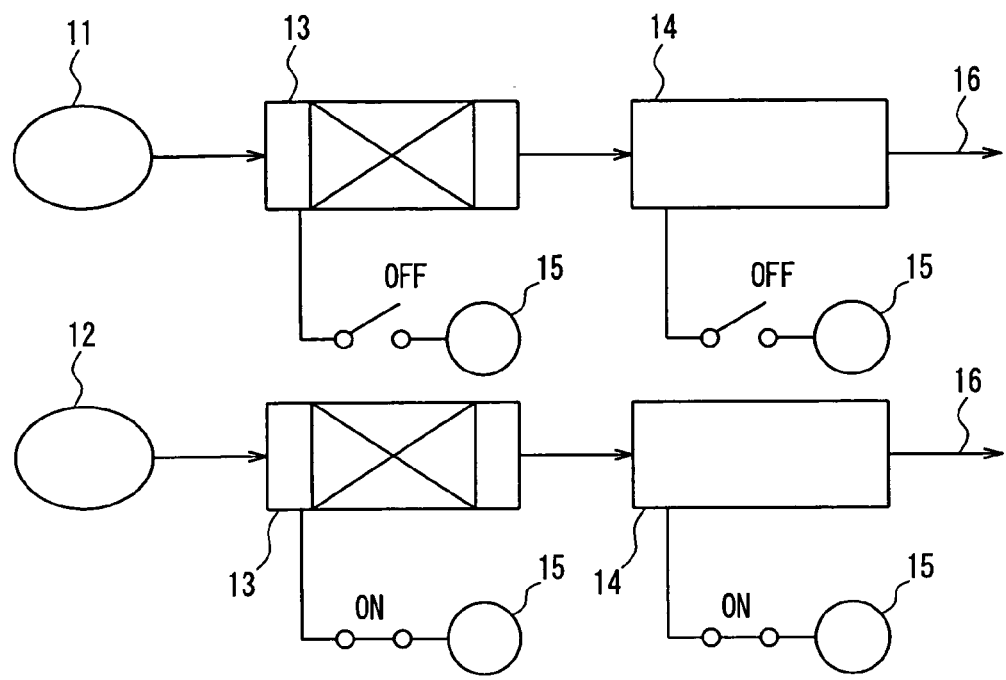
FIG. 3 is a schematic diagram showing an embodiment of an apparatus for treating exhaust gas of the present invention.

FIG. 3 shows an embodiment of the third invention. As shown in FIG. 3, a plurality of flow paths are arranged in a switchable manner, and an adsorbent plasma reactor 13 and a target-component-removal plasma reactor 14 according to the second invention are connected in series from the gas inlet toward the outlet in each of the flow paths. Exhaust gas 11 enters from the upstream side, and target components such as $NO_x$ contained in the exhaust gas 11 are adsorbed with an adsorbent placed in the adsorbent plasma reactor 13. Although this embodiment can be implemented by the adsorbent plasma reactor 13 alone, the addition of the target-component-removal plasma reactor 14 further improves the efficiency.

Figure 4:
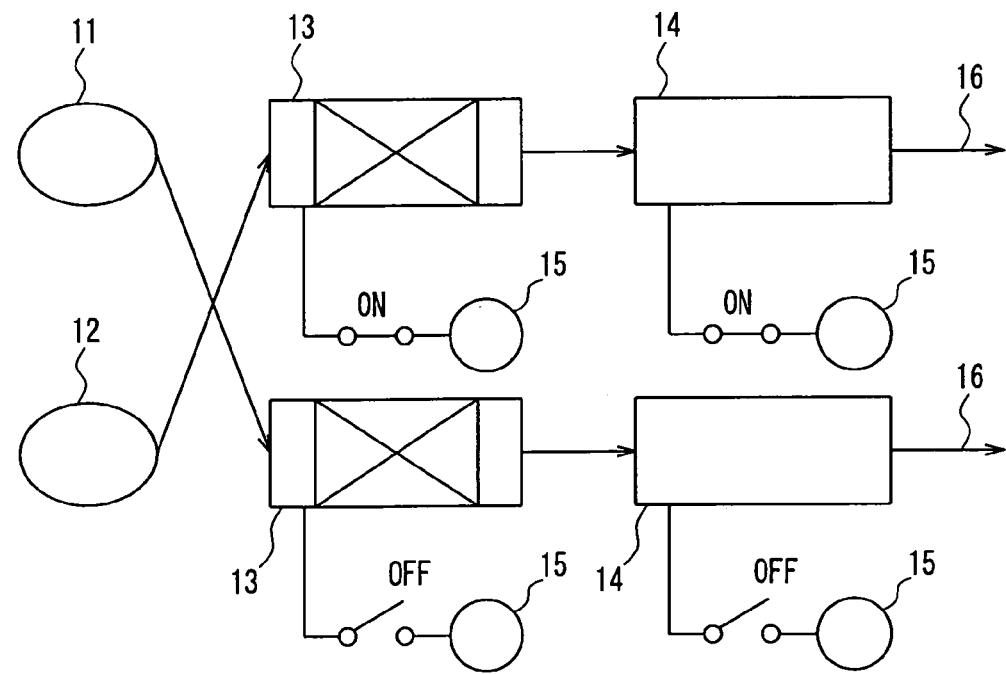
FIG. 4 is a schematic diagram showing an embodiment of the apparatus in which the flow paths of exhaust gas and nitrogen gas are switched.

Subsequently, the flow paths are switched as shown in FIG. 4. While the exhaust gas 11 is treated by another adsorbent, a nitrogen gas 12 with a purity of 90 vol % or more is introduced into the adsorbent that has been used, and plasma sources 15 are turned ON/OFF, thus desorbing the target components and regenerating the adsorbent. After desorption, the adsorbent can be reused to adsorb the exhaust gas. The desorbed target components such as $NO_x$ increase in concentration and are removed with low energy by the target-component-removal plasma reactor 14 following the adsorbent plasma reactor 13. Consequently, clean exhaust gas 16 is discharged. With this treatment, the exhaust gas 16 is always kept clean.

The target-component-removal plasma reactor 14 may be formed integrally with the adsorbent plasma reactor 13.

Figure 5:
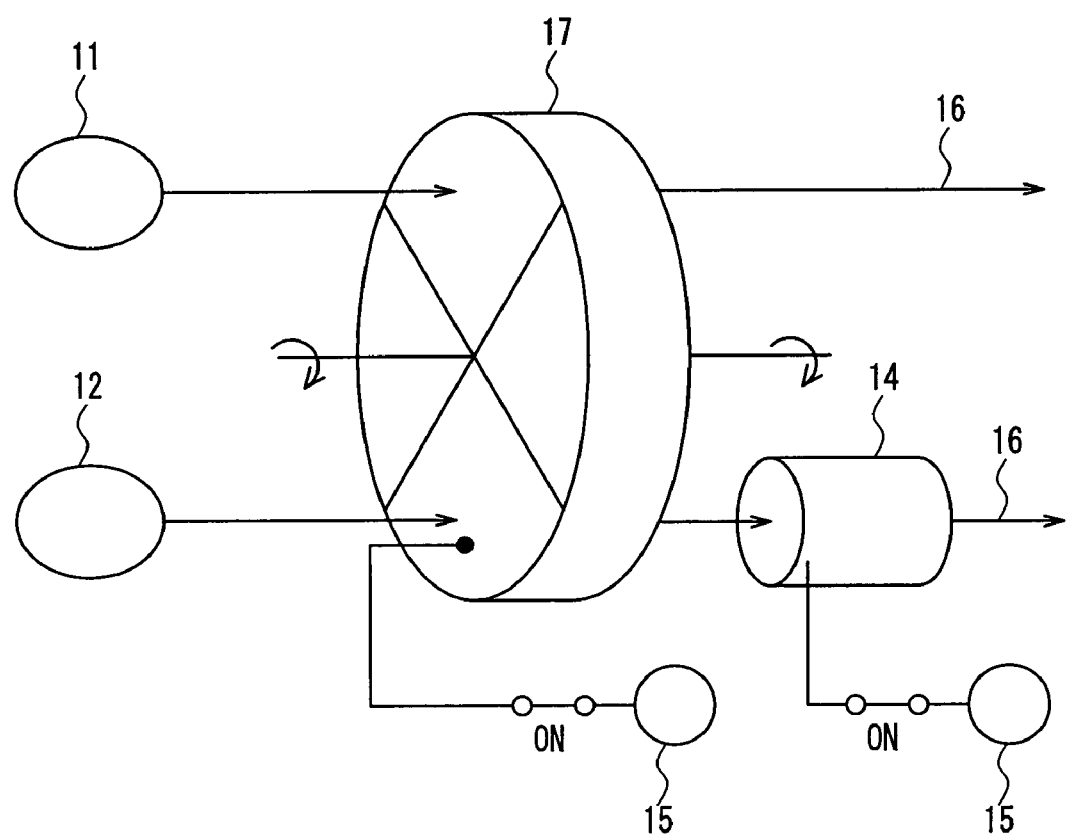
FIG. 5 is a schematic diagram showing another embodiment of the apparatus including a honeycomb adsorbent rotor.

The flow paths may be switched either by valve switching as shown in FIGS. 3 and 4 or by rotating a rotor 17 as shown in FIG. 5. The rotor 17 can switch the flow paths easily.

Figure 6:
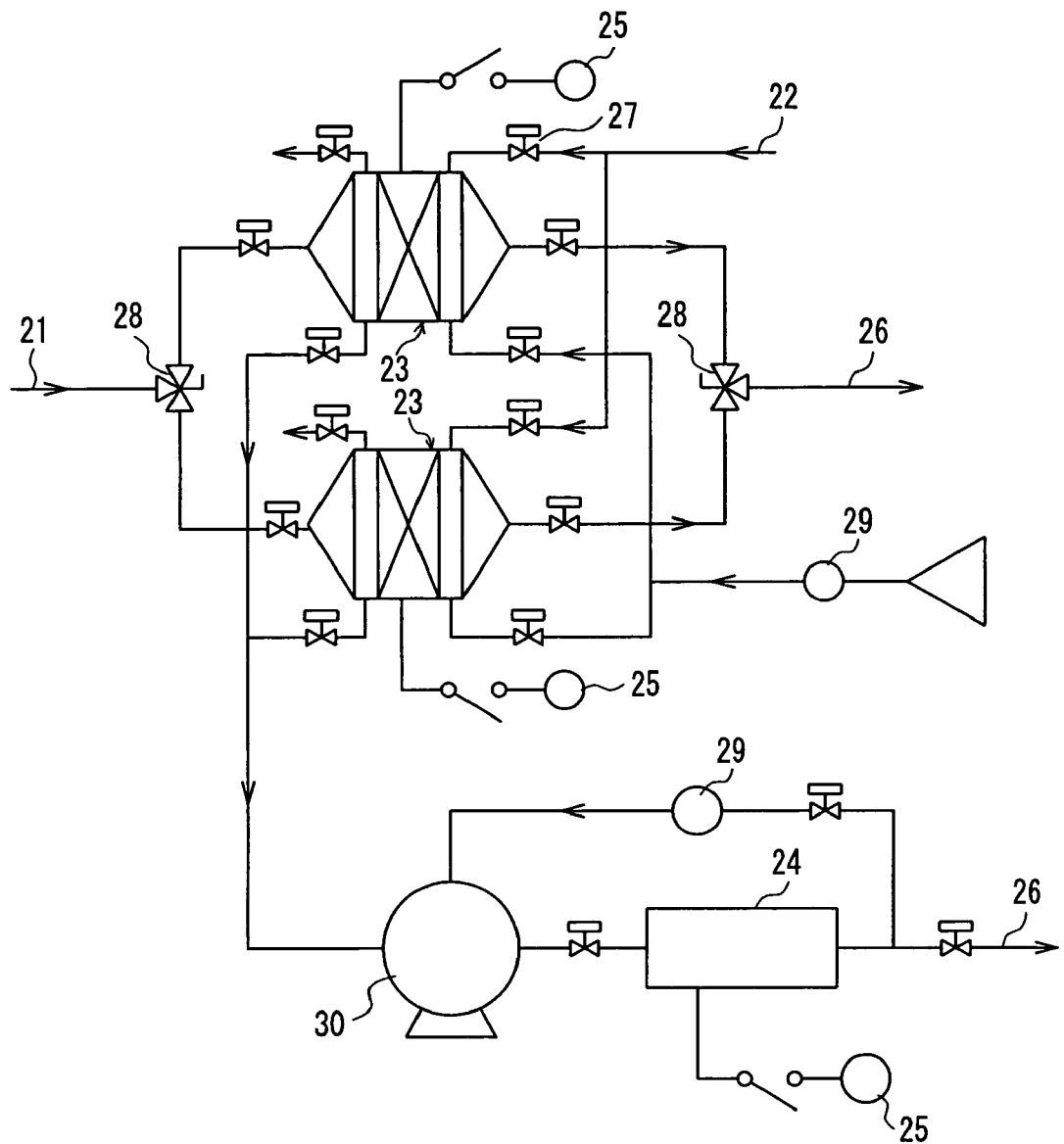
FIG. 6 is a schematic diagram showing yet another embodiment of the apparatus including an exhaust gas recirculation system.

FIG. 6 shows an embodiment in which flow paths for removing the target components form a single-loop exhaust gas recirculation system. Exhaust gas 21 enters from the upstream side, and target components such as $NO_x$ contained in the exhaust gas 21 are directed to be adsorbed with either of two adsorbents 23 by a three-way valve 28. After one of the adsorbents 23 adsorbs the target components, the three-way valve 28 changes the flow path. Then, a valve 27 is opened to allow a nitrogen gas 22 with a purity of 90 vol % or more into the adsorbent 23 that has been used, and a plasma source 25 is turned ON, thus desorbing the target components and regenerating the adsorbent 23. After desorption, the adsorbent 23 can be reused to adsorb the exhaust gas. The desorbed target components such as $NO_x$ increase in concentration and are stored temporarily in a gas tank 30. Then, a pump 29 circulates the stored target components through a target-component-removal plasma reactor 24. At the same time, a plasma source 25 is turned ON, so that plasma is generated to remove the target components in the plasma reactor 24. Consequently, clean exhaust gas 26 is discharged. In this embodiment, the exhaust gas 21 enters from the upstream side and adsorbed by either of the adsorbents 23. Then, the nitrogen gas 22 with a purity of 90 vol % or more is introduced into the adsorbent 23, and the plasma source 25 is turned ON, thereby desorbing the target components and regenerating the adsorbent 23. The direction of introducing the nitrogen gas 22 may be the same as (i.e., parallel flow) or opposite to (i.e., counterflow) the direction of supplying the exhaust gas 21. However, the counterflow is preferred because the adsorbate is desorbed easily.

The exhaust gas treatment apparatus further may include an exhaust device that can accelerate the adsorption and desorption by changing the gas pressure to more than or less than atmospheric pressure.

The exhaust gas treatment apparatus further may include a device that can accelerate the adsorption and desorption by heating or cooling the nitrogen gas.

The plasma treatment tends to be sensitive to the oxygen concentration in the exhaust gas. Therefore, it is preferable that a sensor for measuring the gas concentration, e.g., an oxygen concentration sensor is provided in the exhaust gas flow path. Thus, the plasma can be controlled according to the result of the measurement.

The exhaust gas treatment apparatus preferably includes an aerosol or particulate filter to prevent clogging in the adsorbent plasma reactor and the target-component-removal plasma reactor. However, if the adsorbent plasma reactor has such capabilities due to the effect of an electrostatic collector or filter, it also can serve as the aerosol or particulate filter.

Since the desorption and plasma reaction depend on humidity and temperature, the exhaust gas treatment apparatus preferably includes a means for dehumidifying, heating, and cooling the exhaust gas or the nitrogen gas. For example, a general mist trap, an electric heater for heating, and a blower for cooling can be used.

When the exhaust gas treatment apparatus is installed in a combustion system of any one of a diesel engine, a boiler, a gas turbine, and an incinerator, part of the output can be converted into electric power with a generator so as to drive the plasma reactors.

Hereinafter, the present invention will be described in more detail by way of examples. However, the present invention is not limited to the following examples.

According to the present invention, the exhaust gas emitted from combustion equipment, having a low concentration and containing a large amount of oxygen, can be treated efficiently with dry processing by combining adsorption, desorption, and a nonthermal plasma treatment with a nitrogen gas, so that the apparatus is simple, and in principle a catalyst or additional process is not necessary.

EXAMPLES

Figure 7:
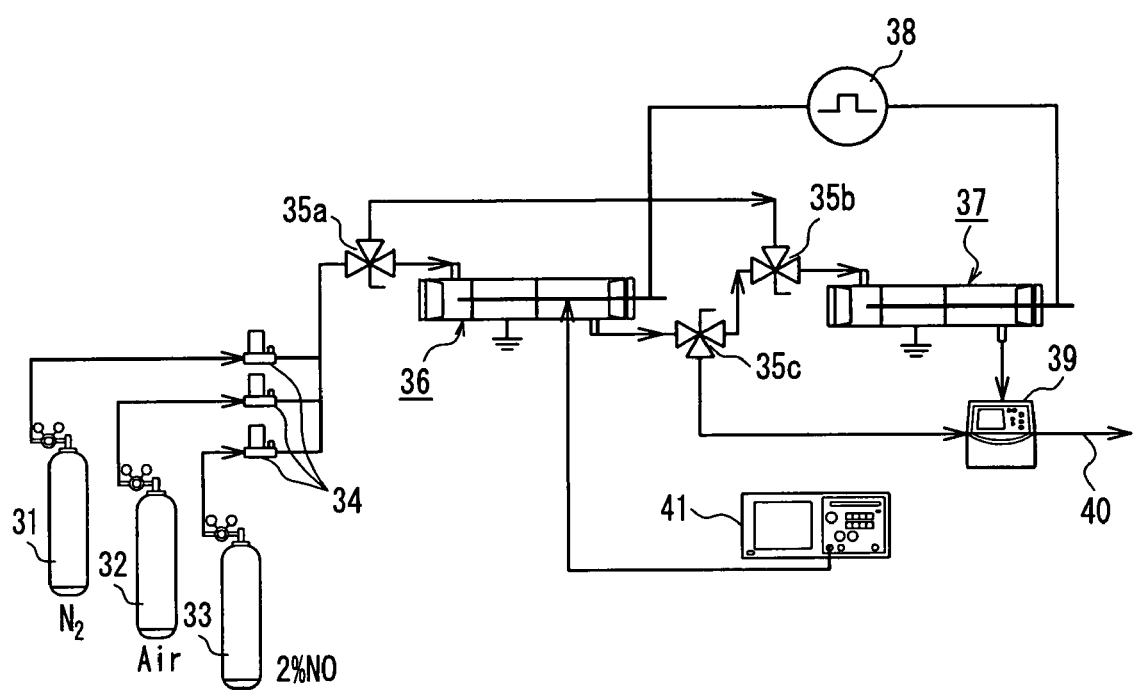
FIG. 7 is a schematic diagram showing the whole configuration used for various measurements of an exhaust gas treatment apparatus in an example of the present invention.

FIG. 7 is a schematic diagram showing an experimental apparatus of this example. A dry nitrogen gas (with a purity of 99%, referred to as nitrogen in the following) 31, dry air (referred to as air in the following) 32, and a 2% dry NO gas diluted with nitrogen (referred to as NO in the following) 33 were mixed through three mass flow controllers 34 where the flow rate and the oxygen, nitrogen, and NO concentrations were controlled at predetermined levels. The mixed model exhaust gas passed through a three-way valve 35a, entered a plasma reactor 36 packed with unused zeolite adsorbent pellets ("MS-13X" manufactured by Merck KGaA), and then was adsorbed with the adsorbent. Subsequently, while nitrogen or air was introduced, a pulse high-voltage source 38 applied a voltage to the plasma reactor 36, so that nonthermal plasma was generated, and the adsorbed NO was desorbed. Moreover, the three-way valves 35a, 35b and 35c were opened/closed to allow the desorbed NO into a plasma reactor 37 following the plasma reactor 36. The NO was removed with plasma generated in the plasma reactor 37.

The plasma reactor 36 was the same in shape as the quartz tube in FIG. 1 and had an inner diameter of 20 mm, an outer diameter of 26 mm, and a length of 450 mm. The pellet-packed bed and the copper mesh electrode of the plasma reactor 36 had a length of 56 mm. The plasma reactor 37 was the same in shape as the quartz tube in FIG. 2 and had an inner diameter of 20 mm, an outer diameter of 26 mm, and a length of 450 mm. The copper mesh electrode of the plasma reactor 37 had a length of 260 mm.

The NO, $NO_2$, $NO_x$, and $O_2$ concentrations were measured with a gas analyzer ("PG-235" manufactured by Horiba, Ltd.) 39. The treated gas was discharged through an exhaust path 40. Reference numeral 41 represents an oscilloscope, a current probe, and a voltage probe.

Figure 8:
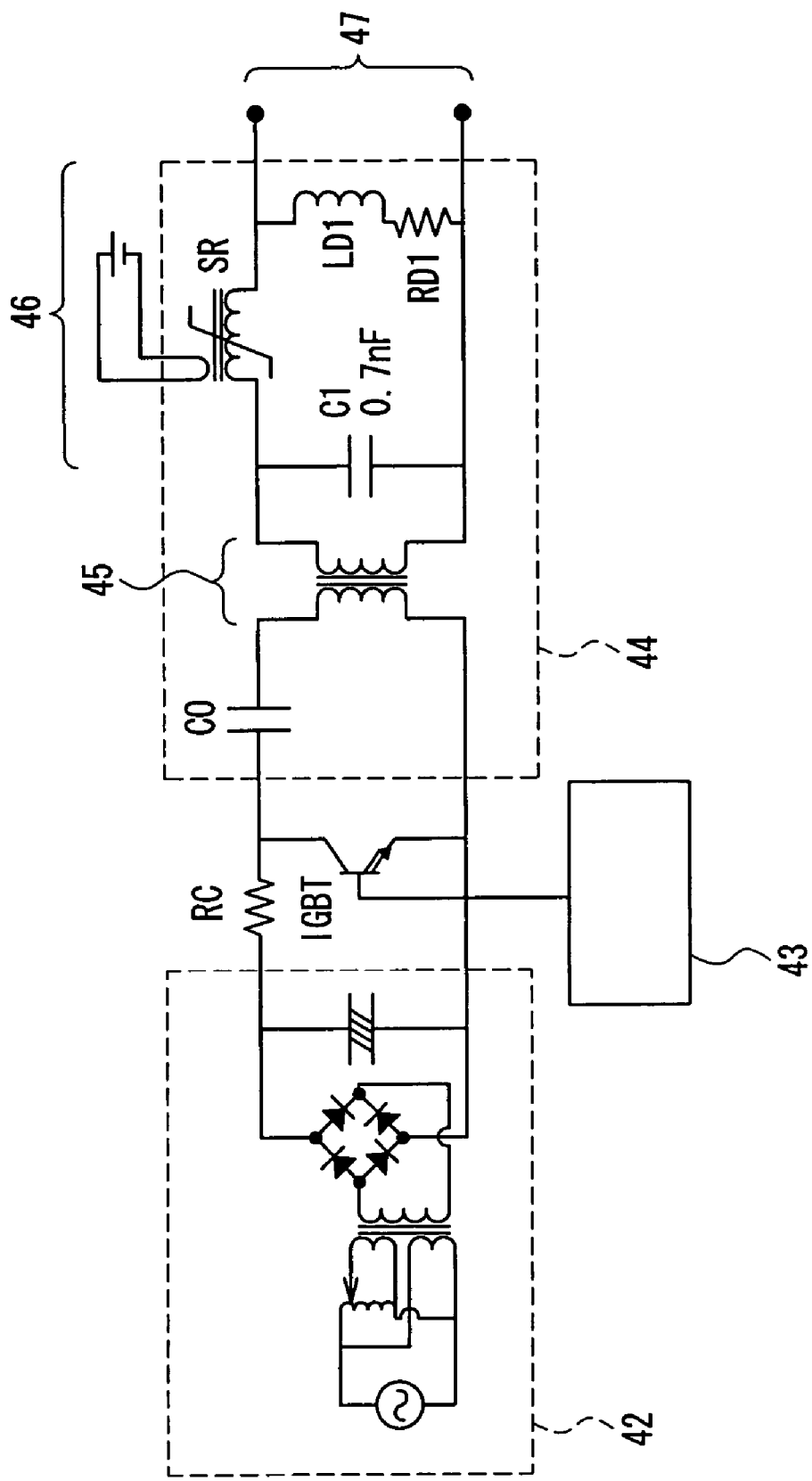
FIG. 8 is a schematic circuit diagram showing a plasma application source in an example of the present invention.

An IGBT pulse high-voltage source ("PPCP Pulsar SMC (30/1000)" manufactured by Masuda Research Inc.) was used as the plasma source 38. FIG. 8 is a circuit diagram of the plasma source 38. In FIG. 8, reference numeral 42 denotes a direct-current power supply with an AC of 200V and a maximum output of 7 A, 43 denotes a gate drive circuit, 44 denotes a high-voltage tank, and C0 denotes a capacitor. An IGBT switches a voltage in the range of 1.5 to 1.9 kV. Moreover, 45 denotes a pulse transformer with a ratio of 1:20, 46 denotes a magnetic pulse compressor, and 47 denotes a high-voltage output of 9 Hz to 1 kHz at 35 kV. The waveforms of the voltage applied to the plasma reactors 36, 37, the current, and the instantaneous power were measured with the oscilloscope ("DL 1740" manufactured by Yokogawa Electric Corporation) and the high-voltage and current probes ("P6015A" and "P6021" manufactured by Sony/Tektronix Corporation). Then, power consumption was determined by the integral of the instantaneous power.

Figure 9:
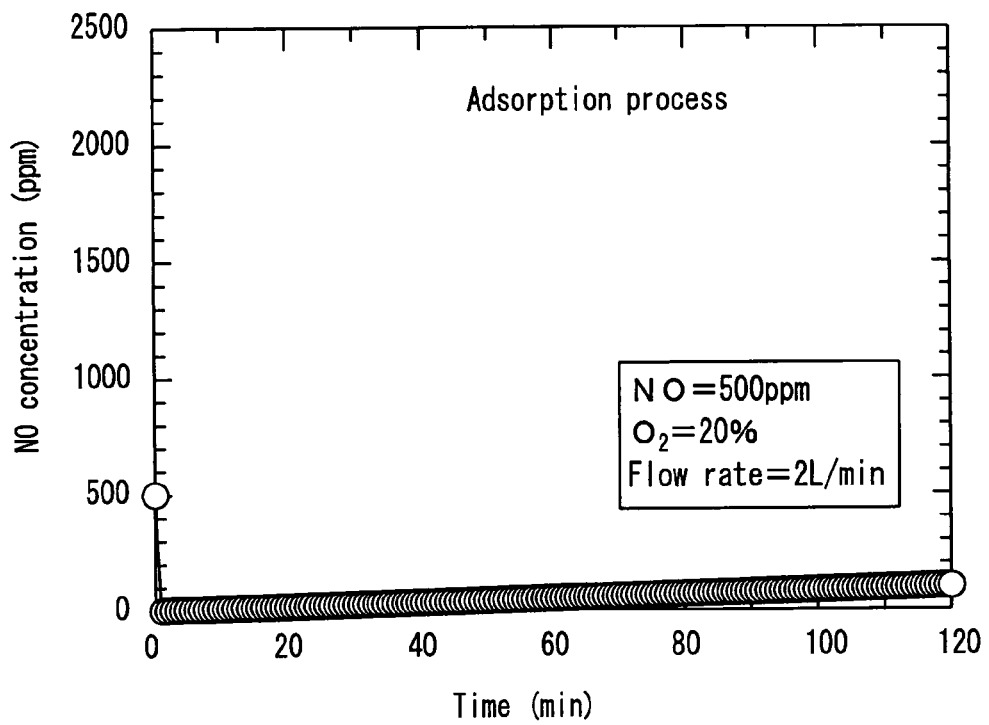
FIG. 9 is a graph showing the relationship between time and NO concentration at the exit of an adsorbent during adsorption in an example of the present invention.

In an adsorption process, the gas mixture of air and NO with a concentration of 500 ppm was adsorbed by the MS-13X in the plasma reactor 36 at a flow rate of 2.0 L/min for 120 minutes. FIG. 9 shows the NO concentration at the exit of the adsorbent. As shown in the graph, at least 80% of NO adsorption continued over 120 minutes.

Figure 10:
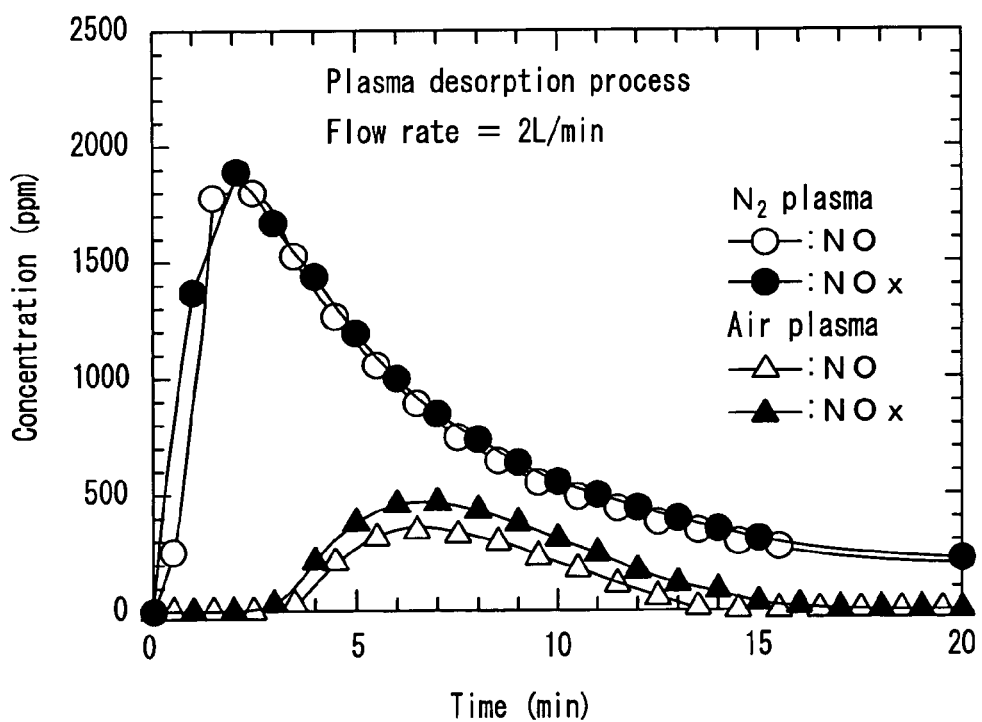
FIG. 10 is a graph showing the relationship between time and NO and $NO_x$ concentrations at the exit of an adsorbent during desorption with air plasma and nitrogen plasma in an example of the present invention.

After the adsorption process, a desorption process was performed by the application of air plasma at 2.0 L/min or nitrogen plasma at 2.0 L/min in the plasma reactor 36. The frequency of the pulse high-voltage source was 420 Hz, and the peak voltage was 31 to 33 kV. FIG. 10 shows the results. Since part of the desorbed NO was oxidized to $NO_2$, the graph also indicates the concentration of $NO_x$ (=NO+$NO_2$). As shown in FIG. 10, the desorption of NO with the nitrogen plasma was more significant (higher in concentration) than that with the air plasma.

Depending on the type of plasma reactor, it is known that $NO_x$ may be produced by a reaction of oxygen and nitrogen in the gas even at low temperatures of about 100° C. However, the plasma reactor 36 used in this example was designed not to discharge $NO_x$ unless NO was adsorbed. Therefore, the $NO_x$ concentration in FIG. 10 resulted from the desorption process.

Figure 11:
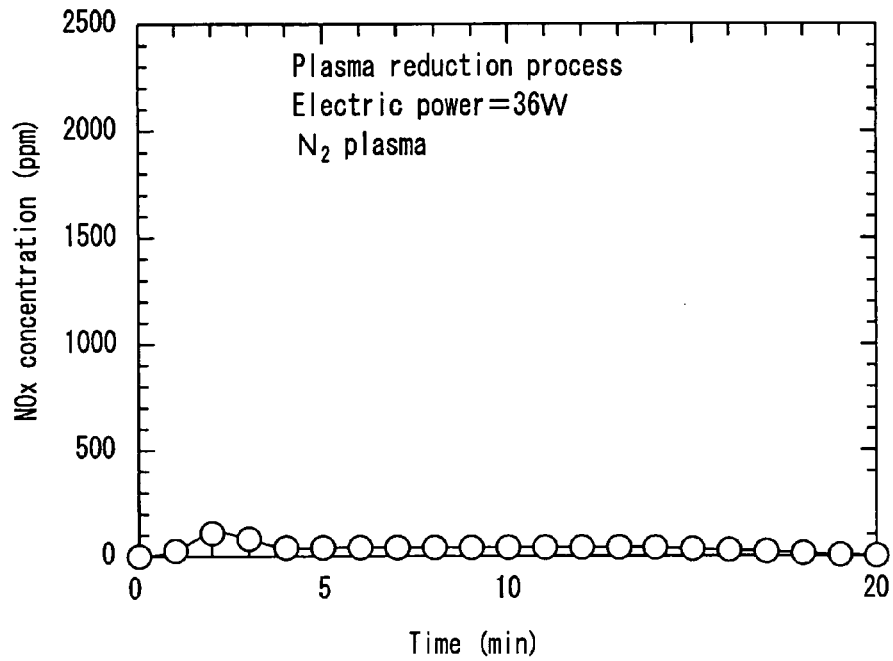
FIG. 11 is a graph showing the relationship between time and $NO_x$ concentration at the exit of a reactor when a plasma treatment is performed after desorption with the nitrogen plasma in an example of the present invention.

The $NO_x$ desorbed by the nitrogen plasma was then treated downstream in the plasma reactor 37. FIG. 11 shows the results. At least 95% of $NO_x$ was removed with power consumption of 36 W.

Figure 12:
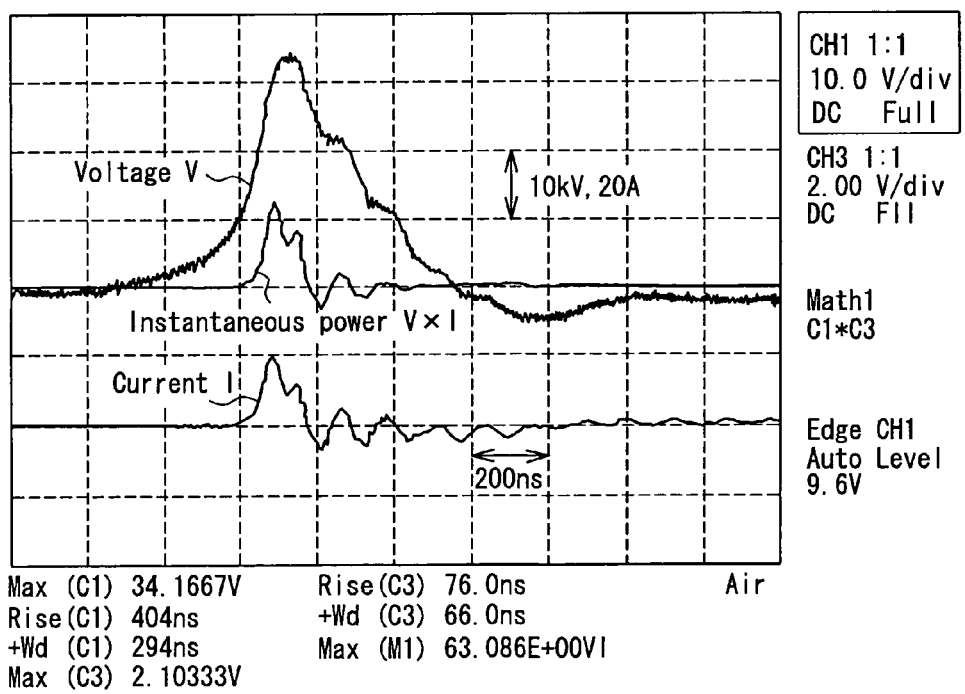
FIG. 12 is a graph showing a voltage applied to an electrode for generating air plasma, a current flowing due to the voltage application, and an instantaneous power in the exhaust gas treatment apparatus in an example of the present invention.
Figure 13:
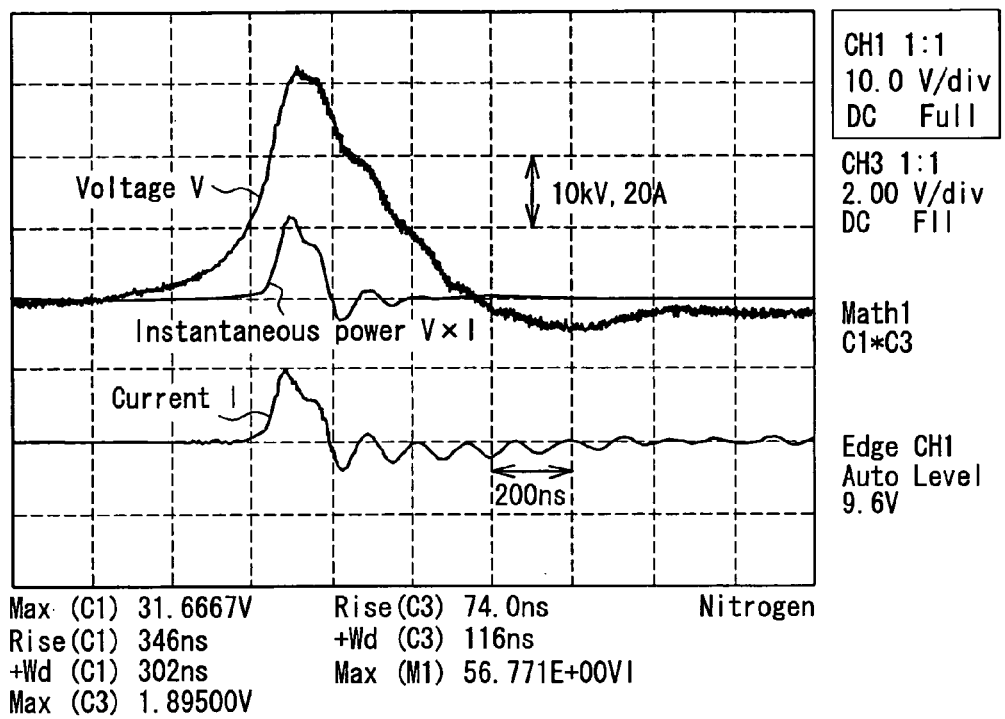
FIG. 13 is a graph showing a voltage applied to an electrode for generating nitrogen plasma, a current flowing due to the voltage application, and an instantaneous power in the exhaust gas treatment apparatus in an example of the present invention.

FIGS. 12 and 13 show the waveforms of a voltage applied to the plasma reactor 36, a current, and an instantaneous power when air and nitrogen were used, respectively. The instantaneous power was the product of the voltage V and the current I in a region of V>0. Both graphs indicate similar waveforms, and the power consumption calculated from the integral of the instantaneous power for air was substantially the same (about 11 W) as that for nitrogen.

These results confirmed that the nitrogen plasma was effective in desorbing a larger amount of NO with the same electric power.

Figure 14:
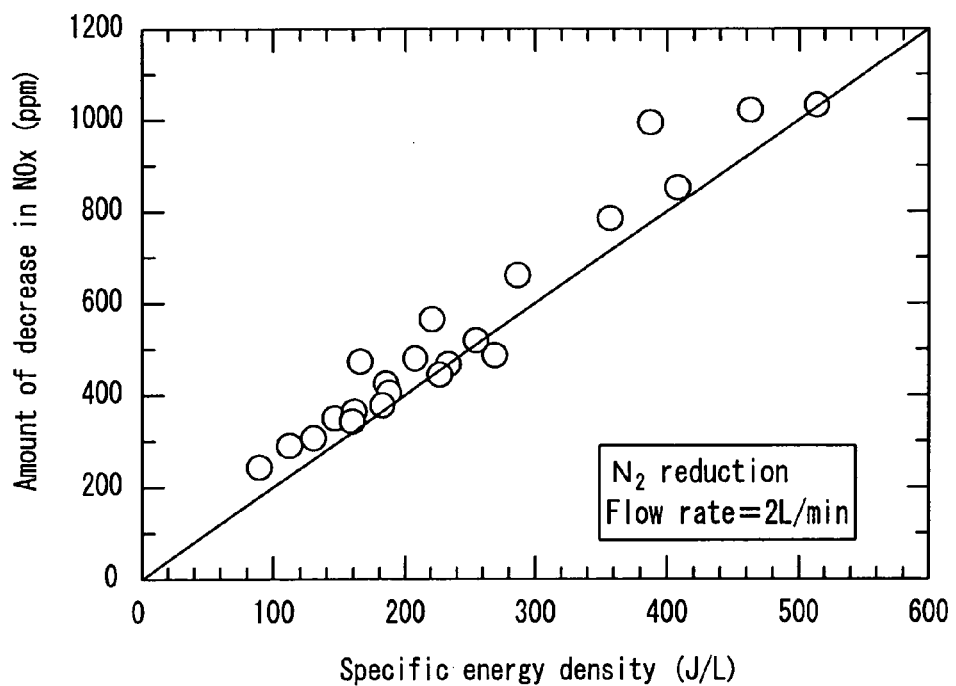
FIG. 14 is a graph showing the relationship between SED and $NO_x$ removal efficiency when plasma treatment is performed in an example of the present invention.

FIG. 14 shows the experimental results of $NO_x$ reduction under various conditions using nitrogen plasma at 2.0 L/min. The specific energy density (SED) and the maximum concentration of removable $NO_x$ were measured by varying the voltage, frequency, and length of a mesh. In this case, the SED is the input energy per unit volume of gas treated and can be expressed as SED=60P/Q (J/L), where P represents discharged energy (W) and Q represents gas flow rate (L/min). As shown in FIG. 14, a 100% reduction of NO to $N_2$ was achieved by 250 J/L (8.3 W in terms of electric power) for the NO concentration of 500 ppm and by about 500 J/L (16.7 W in terms of electric power) for the NO concentration of 1000 ppm.

Figure 15:
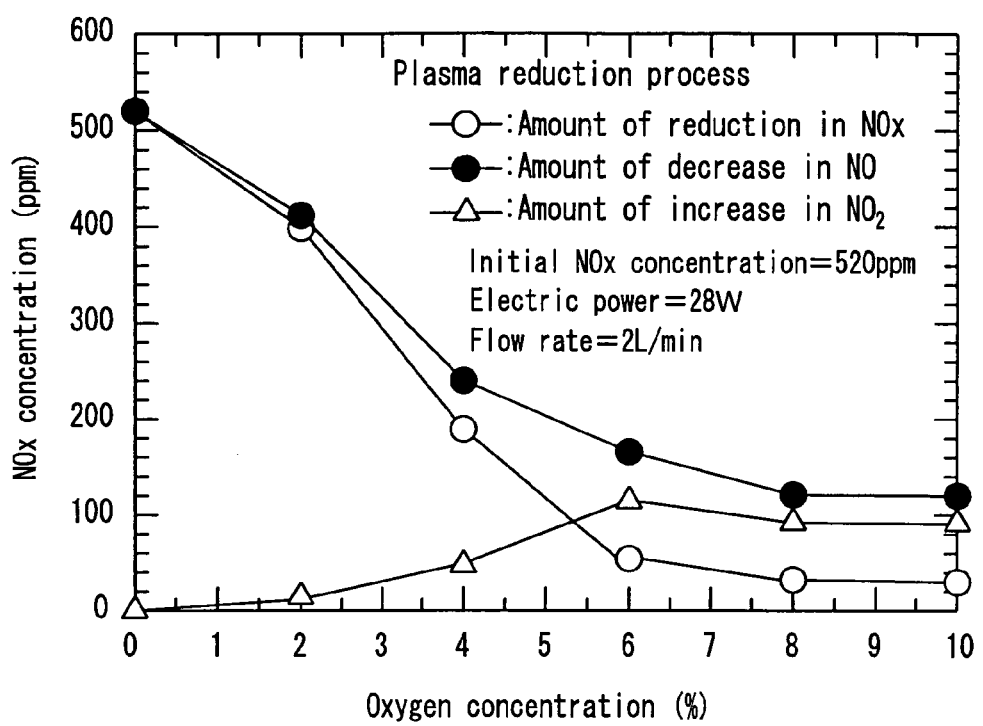
FIG. 15 is a graph showing the relationships between the oxygen concentration and each of the amount of reduction in $NO_x$, the amount of decrease in NO, and the amount of increase in $NO_2$.

FIG. 15 shows the effect of the oxygen concentration on the plasma reaction. The experimental conditions were as follows: the frequency of the source was 420 Hz, V=30 kV, Q=2.0 L/min, and the initial NO concentration was 500 ppm. The plasma power input was 28 W, which was larger than the minimum value calculated in FIG. 14. The oxygen concentration was controlled by mixing air and nitrogen. As shown in FIG. 15, when the oxygen concentration was 0%, almost 100% of NO was removed. However, the NO removal decreased with increasing oxygen concentration, and a proportion of NO converted into $NO_2$ or a small amount of $HNO_3$, $N_2O_5$ or $N_2O$ (not shown) tended to be large. When the oxygen concentration was increased from 6% to 10%, most of NO was converted into $NO_2$ or the like, and thus was less effective in reducing environmental pollution.

As described above, it is difficult to remove nearly 100% of $NO_x$ by only the plasma treatment with a gas containing at least 10% oxygen or a nitrogen gas having a purity of 90% or less. This result shows that part of exhaust gas emitted from a diesel engine may be used as a nitrogen gas with an oxygen concentration of 10 vol % or less and a purity of 90 vol % or more. Thus, the exhaust gas emitted from the diesel engine can be utilized effectively.

In many cases, actual combustion gas inherently contains a few percent of oxygen. Therefore, as is evident from the above experimental results, it is difficult to treat the combustion gas directly with nitrogen plasma (non-oxygen plasma). In this regard, the present invention is superior because the target components of exhaust gas are first adsorbed, and then desorbed and treated with nitrogen plasma.

INDUSTRIAL APPLICABILITY

The apparatus of the present invention can be installed in a combustion system of any one of a diesel engine, a boiler, a gas turbine, and an incinerator.

The invention claimed is:

1. A method for treating exhaust gas using a first plasma reactor and a second plasma reactor that are operationally connected in series along an exhaust gas line, the method comprising:
a first step of adsorbing target components including $NO_x$ in the exhaust gas with an adsorbent,
introducing a nitrogen gas with an oxygen concentration of 10 vol % or less and a purity of 90 vol % or more into the adsorbent, and
applying first nonthermal plasma of the nitrogen gas to the adsorbent by generating an electric discharge, thus causing desorption of the target components and regeneration of the adsorbent; and
a second step of reducing $NO_x$ to $N_2$ by further applying second nonthermal plasma to the target components desorbed by the first nonthermal plasma,
wherein the first step is performed in the first plasma reactor, and the second step is performed in the second plasma reactor, the second plasma reactor following or being integrated with the first plasma reactor.

2. The method according to claim 1, wherein the adsorbent is zeolite with an average pore size of 0.1 to 5 nm.

3. The method according to claim 1, wherein the exhaust gas is combustion exhaust gas, and the target components are at least one selected from the group consisting of NO, $NO_2$, $N_2O$, $N_2O_5$, $SO_2$, $SO_3$, volatile organic compounds (VOCs), dioxins, hydrocarbons, CO, $CO_2$, and water vapor ($H_2O$).

4. The method according to claim 1, wherein the nitrogen gas with an oxygen concentration of 10 vol % or less and a purity of 90 vol % or more is part of exhaust gas emitted from a diesel engine.

5. The method according to claim 1, wherein a gas temperature of the nitrogen gas plasma is 300° C. or less.

6. The method according to claim 1, wherein the plasma is applied by using pulse discharge with an alternating or direct voltage, silent discharge, corona discharge, surface discharge, barrier discharge, honeycomb discharge, pellet packed bed discharge, or any combination of these processes.

7. The method according to claim 1, wherein the plasma is applied by using arc discharge with an alternating or direct voltage, inductively coupled discharge, capacitively coupled discharge, microwave excited discharge, laser induced discharge, electron-beam induced discharge, particle-beam induced discharge, or any combination of these processes.

8. The method according to claim 1 or 2, wherein a catalyst is located in at least one of the following: inside of the adsorbent of the first plasma reactor; inside of the second plasma reactor; and downstream of the second plasma reactor.

9. An apparatus for treating exhaust gas comprising:
a first plasma reactor comprising:
an adsorption portion for adsorbing target components including $NO_x$ in the exhaust gas with an adsorbent;
a gas flow path through which a nitrogen gas with an oxygen concentration of 10 vol % or less and a purity of 90 vol % or more is introduced into the adsorbent; and
a device for applying first nonthermal plasma to the adsorbent; and
a second plasma reactor following or being integrated with the first plasma reactor,
wherein in the first plasma reactor, the adsorbent adsorbs the target components in the exhaust gas, the nitrogen gas flows through the gas flow path in which the adsorbent is present, and an electric discharge is generated so that the first nonthermal plasma of the nitrogen gas is applied to the adsorbent and causes desorption of the target components and regeneration of the adsorbent, and
wherein in the second plasma reactor, $NO_x$ is reduced to $N_2$ by further applying second nonthermal plasma to the target components desorbed by the first nonthermal plasma.

10. The apparatus according to claim 9, wherein the apparatus is installed in a combustion system of any one of a diesel engine, a boiler, a gas turbine, and an incinerator.

11. The apparatus according to claim 9, wherein a plurality of flow paths are arranged, each path including at least one of the first plasma reactor and the second plasma reactor, and the apparatus further comprises a means for switching the flow paths so that the first plasma reactor and the second plasma reactor are operationally connected in series from a gas inlet toward an outlet in the flow paths.

12. The apparatus according to claim 11, wherein the means for switching the flow paths is a valve or rotor.

13. The apparatus according to claim 9, wherein flow paths through which the target components are desorbed and converted into harmless components become an exhaust gas recirculation system.

14. The apparatus according to claim 9, further comprising an exhaust device that accelerates the adsorption and desorption by changing a gas pressure to more than or less than atmospheric pressure.

15. The apparatus according to claim 9, further comprising a device that accelerates the adsorption and desorption by heating or cooling the exhaust gas or the nitrogen gas.

16. The apparatus according to claim 9, further comprising a gas measuring device that includes a sensor for detecting an oxygen concentration in the exhaust gas.

17. The apparatus according to claim 9, further comprising a particulate collector for collecting aerosol or particles in the exhaust gas.

18. The apparatus according to claim 9, further comprising a humidity controller for controlling a humidity of the exhaust gas or the nitrogen gas.

19. The apparatus according to claim 9, wherein the nitrogen gas with an oxygen concentration of 10 vol % or less and a purity of 90 vol % or more is part of exhaust gas emitted from a diesel engine.

* * * * *